United States Patent
Podl et al.

(10) Patent No.: US 8,233,172 B2
(45) Date of Patent: Jul. 31, 2012

(54) SYSTEM AND METHOD FOR NOTIFICATION OF MULTI-FUNCTION PERIPHERAL RECEIVE JOB

(75) Inventors: Brian Podl, Newport Beach, CA (US); Walter Filbrich, Manhattan Beach, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1260 days.

(21) Appl. No.: 11/371,549

(22) Filed: Mar. 9, 2006

(65) Prior Publication Data

US 2007/0211279 A1  Sep. 13, 2007

(51) Int. Cl.
*G06K 15/00* (2006.01)
*G06F 3/12* (2006.01)
*G06F 17/30* (2006.01)
*G06F 12/00* (2006.01)
*H04N 1/00* (2006.01)

(52) U.S. Cl. ...... 358/1.15; 358/1.14; 358/407; 358/476; 707/755; 707/756; 707/818

(58) Field of Classification Search ................. 358/1.15, 358/1.14, 402, 407, 444, 440, 441, 476; 379/100.06, 379/144.07, 288, 133, 93.31, 93.03, 93.24, 379/1.03, 40, 102.02; 455/415, 460, 96; 707/755, 756, 802, 804, 818

See application file for complete search history.

(56) References Cited

U.S. PATENT DOCUMENTS

| 6,552,813 | B2 * | 4/2003 | Yacoub ........................ 358/1.1 |
| 2002/0140989 | A1 * | 10/2002 | Shinchi et al. ............... 358/402 |
| 2005/0036167 | A1 * | 2/2005 | Atsumi ........................ 358/1.15 |
| 2005/0094193 | A1 * | 5/2005 | Oswald ........................ 358/1.15 |
| 2005/0191077 | A1 * | 9/2005 | Nishizawa et al. ............ 399/80 |
| 2006/0136566 | A1 * | 6/2006 | Ohara et al. ................. 709/217 |

* cited by examiner

*Primary Examiner* — Benny Q Tieu
*Assistant Examiner* — Ngon Nguyen

(57) ABSTRACT

Methods, systems, and software for notification of multi-function peripheral (MFP) receive jobs are disclosed. A system provides a MFP configured to store at least one remote communication identifier, to process a MFP job associated with the at least one remote communication identifier, and to transmit, in response to an event associated with the MFP job, notification directed to the remote communication identifier. The MFP may receive the remote communication identifiers from embedded MFP jobs or may receive them from previously stored user profiles that specify notification preferences for different job types. The remote identification identifier may be, for example, an email address or a telephone number.

31 Claims, 5 Drawing Sheets

Example Embedded (email or text message) Notification Message for a Print Job

```
<ESC>%-12345X
@PJL Job
@PJL NOTIFYEMAIL="Joeuser@domain.com"
@PJL NOTIFYMSG="Joe, please read this report ASAP!"
<ESC>EWar and Peace<ESC>E
<ESC>%-12345X
@PJL EOJ
<ESC>%-12345X
```

52 — <ESC>%-12345X
54 — @PJL Job
56 — @PJL NOTIFYEMAIL / @PJL NOTIFYMSG
60 — @PJL EOJ

FIG. 3

Example Delivered (email or text message) Notification Message for a Print Job

```
Message:    Print job is available
Job Name:   Acme Corp Report
Job Msg:    Joe, please read this report ASAP!
Time:       4:45pm
Date:       08/23/05
MFP Name:   MFP 1
Location:   Printer Room 1
Pages:      5
```

70 — Message:
74 — Job Name:
76 — Job Msg:
78 — Time:
80 — Date:
82 — MFP Name:
84 — Location:
86 — Pages:

FIG. 4

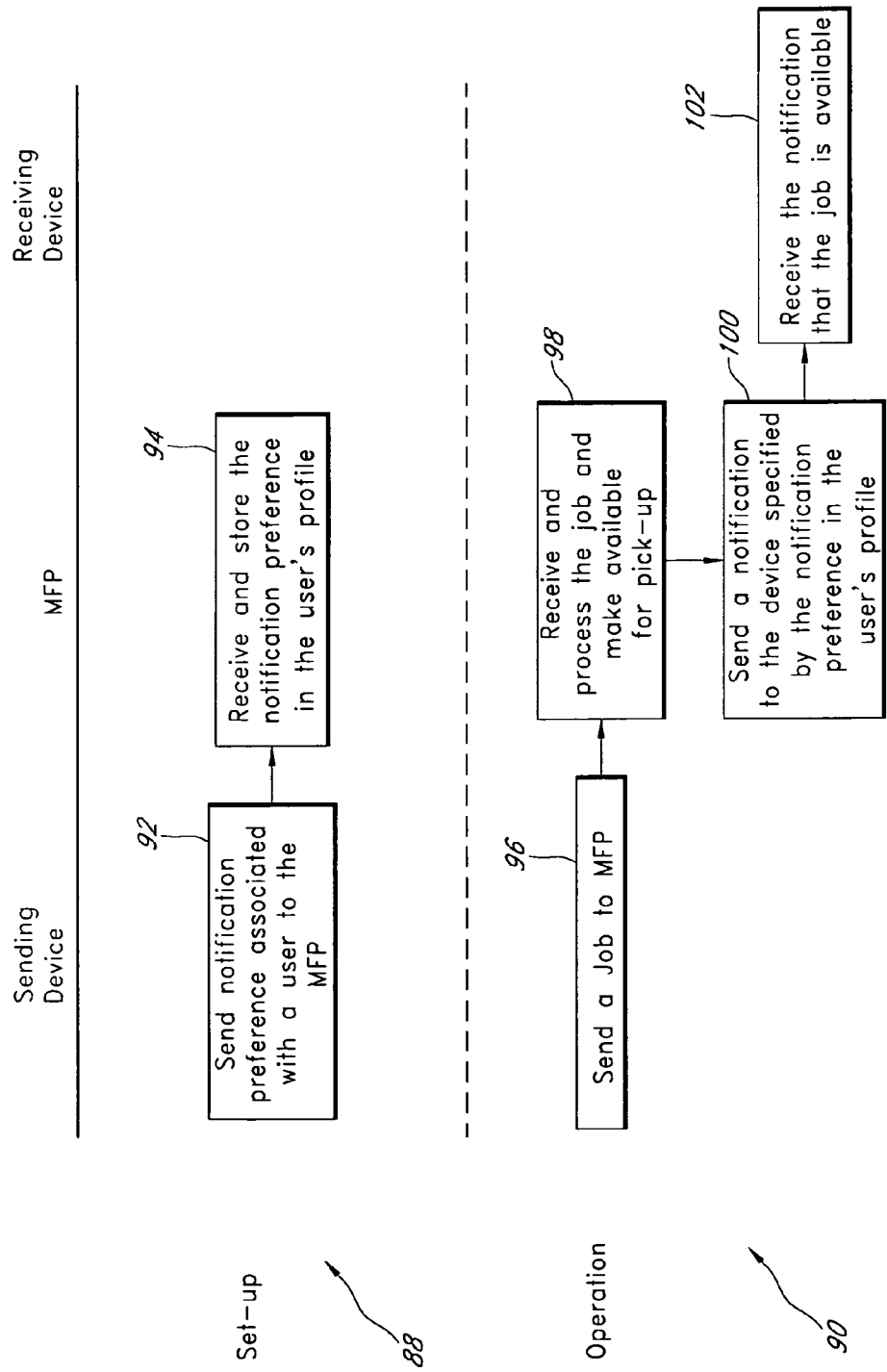

SYSTEM AND METHOD FOR NOTIFICATION OF MULTI-FUNCTION PERIPHERAL RECEIVE JOB

BACKGROUND OF THE INVENTION

1. Field of the Invention

The invention relates to the operation of a multi-function peripheral (MFP) device. More particularly, the invention relates to notification of MFP receive jobs.

2. Description of the Related Technology

Presently, many peripheral devices have limited notification abilities. One kind of peripheral device is a multi-function peripheral (MFP), which is a device that performs multiple peripheral functions, such as printing, copying, scanning, and faxing. (MFP devices are defined in more detail below.) Typically, notification from a MFP is through the user interface mechanism. The user interface may be remotely accessed from a custom application running on a host personal computer, or, alternatively, the user interface may be remotely accessed through a web browser. Implementing notification through a user interface is disadvantageous to both senders and recipients of MFP jobs. For senders, notification via a user interface may be inconvenient. Because receivers are not notified directly, many senders feel the need to notify them personally. The remote sender of a MFP job typically must use one of the following techniques of direct communication: email, telephone, or text message. If the sender is local, then direct person-to-person communication to the intended recipient may also have to be used. The remote user communication to the intended recipient may also be expensive, in addition to being inconvenient. For recipients, notification by means of a user interface may also be inconvenient. The notification is simply broadcast as a status to all listeners, requiring recipients to periodically check the user interface for jobs intended for them. In other words, notification is only available to querying listeners. Thus, there is a need for improved notification of MFP receive jobs.

SUMMARY OF CERTAIN INVENTIVE ASPECTS

The need to improve notification of MFP receive jobs is satisfied by providing methods, systems, and software for providing notice directly to intended recipients of a particular MFP job. In general, the methods, systems, and software provide direct notification of the event status of a MFP job. The methods, systems, and software accomplish this by communicating an identifying message to a location specified by the sender of the MFP job where the recipient of the MFP job may be expected to notice the message.

In one embodiment of the invention, a method of multi-function peripheral (MFP) job notification is provided, the method comprising receiving a notification message, associating a MFP job with the notification message, and sending, in response to an event associated with the MFP job, the notification message to at least one remote communication device.

In another embodiment of the invention, a method of multi-function peripheral (MFP) job notification is provided, the method comprising receiving at least one remote communication identifier, associating a MFP job with the at least one remote communication identifier, and directing a notification message, in response to an event associated with the MFP job, to the at least one remote communication identifier.

In another embodiment of the invention, a system for multi-function peripheral (MFP) job notification is provided, the system comprising a MFP, the MFP being configured to store at least one remote communication identifier associated with a remote communication device, being further configured to process a MFP job associated with the at least one remote communication identifier, and being further configured to transmit, in response to an event associated with the MFP job, notification directed to the device associated with the remote communication identifier.

In another embodiment of the invention, a computer readable medium having machine loadable software for multi-function peripheral (MFP) job notification, wherein the software is configured to perform a method comprising providing a user interface, wherein the user interface is configured to receive at least one remote communication identifier for at least one MFP job type, creating, for at least one user, a user profile that comprises the at least one remote communication identifier for the at least one MFP job type, and storing the at least one user profile.

In another embodiment, a computer readable medium having machine loadable software for multi-function peripheral (MFP) job notification is provided, wherein the software is configured to perform a method comprising providing a user interface for receiving at least one remote communication identifier associated with a remote communication device, and embedding the at least one remote communication identifier in a MFP job.

In another embodiment, a system for multi-function peripheral (MFP) job notification, the system comprising a processor, and software executed by the processor, configured to perform the following: setting notification preferences in the MFP, receiving a MFP job, and sending a notification of the received job to a remote communication destination in a format specified by the notification preferences.

BRIEF DESCRIPTION OF THE DRAWINGS

FIG. 3 is an example of an embedded notification message for a fax job.

FIG. 4 is an example of a delivered notification message for a fax job.

FIG. 5 is a flowchart of the set up for providing notification by storing notification preferences in a user profile.

DETAILED DESCRIPTION OF CERTAIN INVENTIVE EMBODIMENTS

Figure 1:
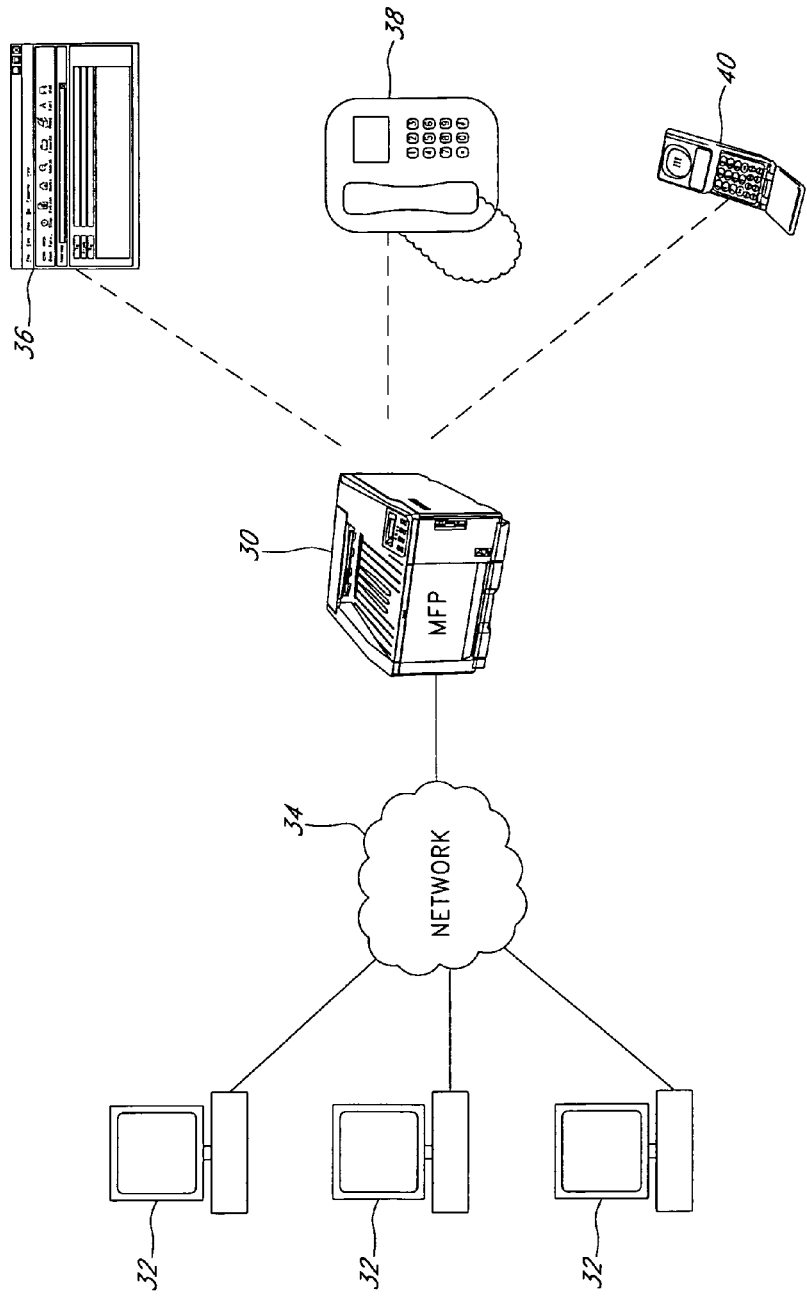
FIG. 1 illustrates a MFP configured to notify MFP job recipients of a MFP job event in accordance with an embodiment of the invention.

Various aspects and features of the invention will become more fully apparent from the following description and appended claims taken in conjunction with the foregoing drawings. In the drawings, like reference numerals indicate identical or functionally similar elements. The drawings, associated descriptions, and specific implementation are provided to illustrate the embodiments of the invention and not to limit the scope of the disclosure.

In general, the invention relates to methods, systems, and software for implementing notification of multi-function peripheral (MFP) receive job notification. (MFP devices are defined in more detail immediately below.) There are many circumstances when the intended recipient of a MFP job may wish to be notified that their job is ready for pick-up. Existing notification services on current MFP devices are limited and inconvenient. One purpose of the invention is to provide enhanced MFP notification services so that a recipient of a MFP job may be notified directly by convenient means of communication, such as email, telephone, and text message.

A multi-function peripheral (MFP) device is a single integrated device configured to perform two or more functions, including without limitation scanning, copying, printing, faxing, combinations of the same and the like. The functionality of a MFP device may be accessed over a network, including, for example, the Internet or a LAN, or at the device itself. A MFP device may be configured with sufficient memory to queue jobs waiting to be processed. It will be appreciated that MFP devices may be configured to perform in a variety of different networked and standalone computing environments.

Although the following embodiments discuss the invention with reference to a MFP device, the invention is not limited to MFP devices, as the enhanced notification services contemplated by the present invention may be applied to single-function peripheral devices as well. Because the peripheral market is increasingly employing MFP devices to satisfy peripheral needs, the embodiments below and the succeeding language in the claims use "MFP" universally to refer to any peripheral device that may be configured to implement the invention. It will be appreciated that the invention may be implemented in single-function peripheral devices as well. Thus, the described embodiments below should not be construed to limit the application of the inventive aspects to MFP devices. As used herein, "MFP" should be construed to include single-function peripheral devices. Moreover, "MFP" should also be construed to include an aggregate of single-function peripheral devices that may perform one or more functions.

A typical MFP job recipient has access to one or more of the following communication devices: email client, telephone, or text message client. These devices all provide access away from the location of the MFP. These devices also provide forms of communication that the user is accustomed to and uses frequently. Current MFP technology does not take advantage of these devices, even though the MFP can be connected to the Internet and telephone line, and may also have access to, or even have built-in, a text message server. Current MFP technology does not use the available access to these devices to notify an intended recipient that an MFP job has been received at the specified destination.

Embodiments of this invention enhances MFP job receive notification. Certain embodiments of the invention takes advantage of forms of communication devices that a recipient of a MFP job may have access to, such as email clients, telephones, and text message clients. Other embodiments allow the user to specify the content of the notification message for the intended recipient when a job is received by the MFP. In addition, the user may also specify the remote communication device they wish to use for the notification. This enhanced capability is very convenient for the user of an MFP.

It may also be important to the user that they be notified of a MFP-received job intended for them as soon as possible. Accordingly, embodiments of the invention make it possible for a user of a MFP to be immediately notified when there is a MFP job available that is intended for them. Embodiments of the invention also enable the sender of a MFP job to embed the notification information in the MFP job. This relieves the sender of the burden of contacting the intended recipient in some way, such as by email, telephone, or text message. The sender simply enters the notification information and sends the MFP job. This type of remote notification can be more convenient and less expensive for the sender.

Other embodiments of the invention, allow a user to store notification preferences, relieving the sender of the burden of specifying notification information each time that a job is processed. In this embodiment, the user specifies notification preferences for particular types of jobs, or even sub-categories of jobs. These notification preferences may be stored in profiles corresponding to each user. When the MFP receives a job to process, the MFP may access the stored profiles to determine the notification information corresponding to the particular user and the particular job type.

In some embodiments, the MFP may have a mailbox feature. This feature is set up by the user from the MFP user interface. Typically, a user will have a password or PIN for their set up mailbox but may not be required to specify one. The mailbox information can be embedded in remote MFP jobs so that the job is directed to the specified mailbox. A job directed to a mailbox may also have further security built in with the sender's specified password or PIN that is required for the intended recipient to open a job. This type of job is typically referred to as a secured job. Typically, a secured job is a fax or stored job. The jobs are stored until opened by the user entering the correct password or PIN. After opening the job, the user may direct the job to the desk station they desire. Examples include print and email. Typically, mailbox job notification in a MFP is just another destination for a MFP job. Embodiments of the invention extend the typical notification capabilities of a MFP so that when a mailbox job is received, the mailbox user may be notified via the notification they specified. The user enters notification information via the user interface for the MFP for a mailbox for which they wish to be notified. Alternatively, the user may submit the mailbox notification information via an embedded message in job protocol commands. Thus, mailbox notification information may be provided for each job, or stored for particular jobs specified by a user.

Some embodiments of the invention may comprise one or more software programs that are executed by one or more processors. For example, the processor may have a configuration based on Intel Corporation's family of microprocessors, such as the Pentium family. In other embodiments, the software modules may comprise logic or software instructions embodied in hardware or firmware. It will be further appreciated that hardware may be comprised of connected logic units, such as gates and flip-flops, and/or may be comprised of programmable units, such as EPROM, EEPROM, programmable gate arrays or processors. Further, the hardware may comprise a standalone dedicated device or general purpose computer with executable software.

In summary, the embodiments of the invention described herein extend the remote notification capabilities of a MFP so that once a MFP job is received, processed, and available for pickup (or otherwise needs user attention for a job-related event), specified recipients may be notified by any combination of direct communication, such as email message, phone voice message (or identifying tone), or cell phone text message. The notification may be sent via the Internet, phone line, or wireless phone signal. Information that makes up the notification message may include device messages, user specific messages, MFP name and location, job name, date and time, submission user name, and/or fax telephone number. The notification may also include other relevant information.

FIG. 1 illustrates an MFP 30 configured to implement embodiments of the invention. The MFP 30 is connected to network computing devices 32 via the network 34. The connections between the MFP 30 and the network computing devices 32 via the network 34 may be by way of wire or wireless communication, or any other suitable technique for connecting devices for data communication. The MFP 30 is also configured to communicate with various remote communication devices. In this embodiment, the MFP 30 is configured to communicate with an email client 36, a telephone 38, and a text message client 40 (e.g., a text message client of a cellular phone). The MFP 30 may be connected to these devices by means of wire or wireless communication, for instance, or any other suitable technique for connecting devices for data communication. Those of ordinary skill in the art will appreciate that a MFP may be configured to communicate with numerous other devices.

Figure 6:
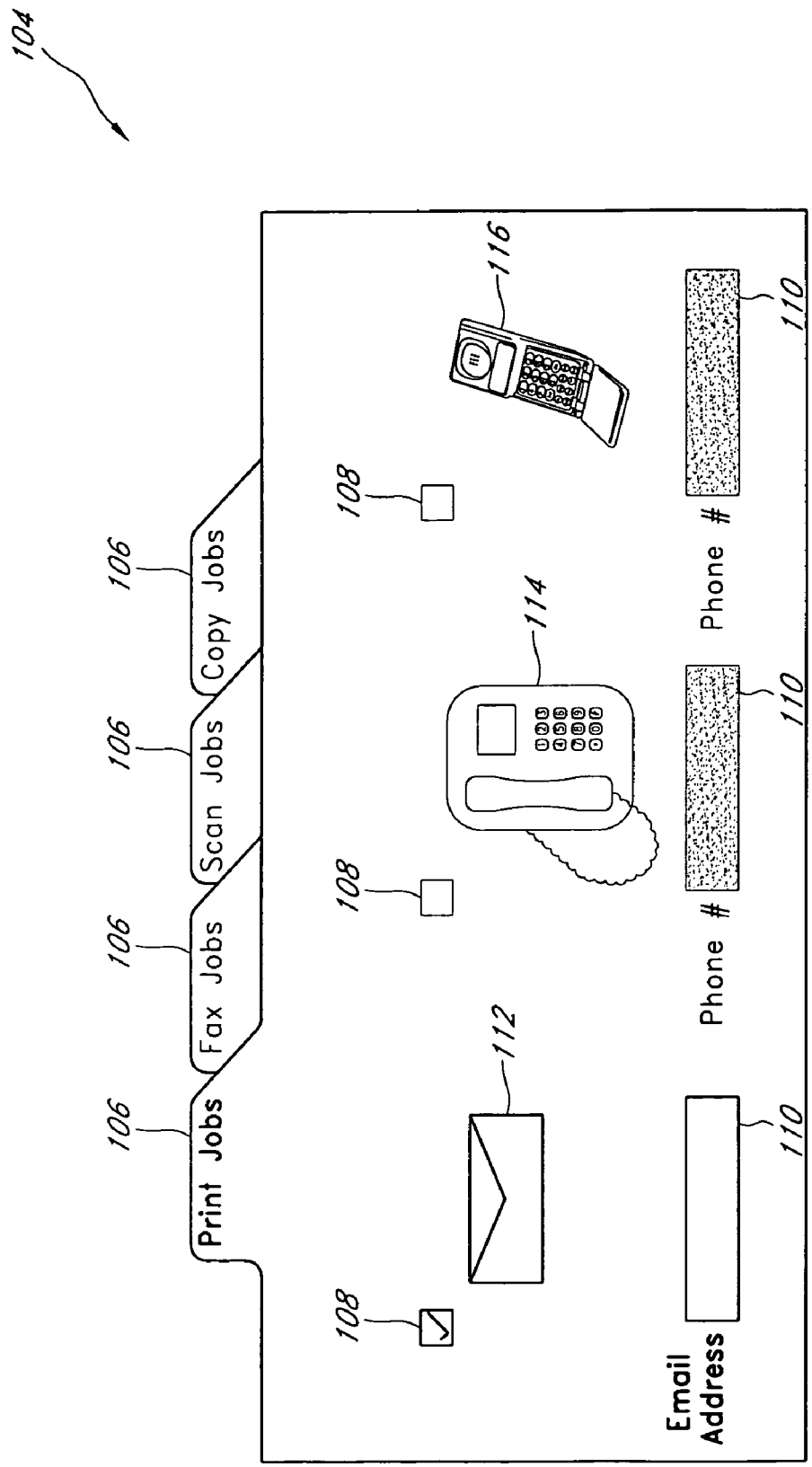
FIG. 6 is an example user interface to receive and store notification preferences in a user profile.

The MFP 30 may receive jobs from users in a number of ways. In one embodiment users may submit jobs by accessing the MFP user interface at the MFP 30. Alternatively, users may submit jobs from the networked computing devices 32 by accessing the MFP user interface through a web browser over the network 34. Additionally, users may submit jobs from software installed on the networked computing devices 32 that implement the MFP user interface. With reference to FIG. 6, more detail is provided below for an example user interface that may be accessed at the MFP 30, from a web browser operating one of the networked computing devices 32, or from software running on one of the networked computing devices 32. Those of ordinary skill in the art will appreciate that there are other possible application software and network configurations that may be utilized to implement MFP user interfaces in accordance with the embodiments of the invention.

The MFP 30 may implement both job-specific MFP notification and user-stored MFP notification. For job-specific MFP notification embodiments, the MFP 30 receives notification information from a user when the job is received. Methods implementing this embodiment are described in more detail below with reference to FIG. 2. For user-stored MFP notification, the MFP 30 receives notification information from a user prior to the submission of a MFP job. The MFP 30 stores the notification information for the user, and then accesses the information upon receiving a MFP job from the user. Methods implementing this embodiment are described in more detail below with reference to FIG. 5.

The MFP 30 may be configured to communicate notification messages in a variety of ways. As described above, the MFP 30 may be configured to communicate with various remote communication devices, such as an email client 36, a telephone 38, and a text message client 40. Although not illustrated, the MFP 30 may also be configured to communicate with walkie-talkie radios, Bluetooth devices, other wireless protocol devices, paging devices, and any other direct-communication devices. Accordingly, the MFP 30 may be configured to transmit information via digital packets, digital and analog telephone signals, wireless phone signal, short range frequency, radio frequency, and other signal or information transmission. Moreover, the MFP 30 may be connected to various network systems, such as the Internet, telephone system, and wireless telephone system.

Although not illustrated here, in some embodiments, the MFP 30 may not perform the notification, but rather may pass along the notification information to a forwarded device. For instance, the MFP 30 may forward a MFP job to another device, which performs the notification. The other device might be another MFP or might be a central repository. In the case of a central repository, the MFP might convert the MFP job to a file storage format before passing it along to the central repository. For instance, a MFP might convert a fax job into file storage format and forward the converted file, along with the notification message, to a central repository, which interprets the notification message and performs the notification.

The MFP 30 may also be configured to communicate a variety of different types of notification messages based on the configuration of the MFP 30 and the information received from the user. In the described embodiments, users specify at least one remote destination identifier. Once a MFP job event becomes ready for user attention, the MFP 30 directs a notification message using the remote destination identifier. In some embodiments, the user need only specify a remote destination identifier without specifying the contents of the message. For instance, a notification message may be as simple as a telephone call originating from the MFP 30. In this embodiment, the user need only specify a telephone number. In other embodiments, the call may include an identifying tone or may include an automated voice message. In either case, the tone or message may be provided by the user or a preset configuration of the MFP 30. A notification message may also be as simple as receiving an email or a text message originating from the MFP 30. In this embodiment, the user need only specify an email address or a telephone number, respectively. In other embodiments, these email messages and text messages may also comprise additional notification information, including, but not limited to, device messages, user specific messages, MFP name and location, job name, date and time, submission user name, and/or fax telephone number. One skilled in the art will also appreciate that email and text messages may be sent with attached files that comprise text, sound, or images. These attached files may also include notification information.

Figure 2:
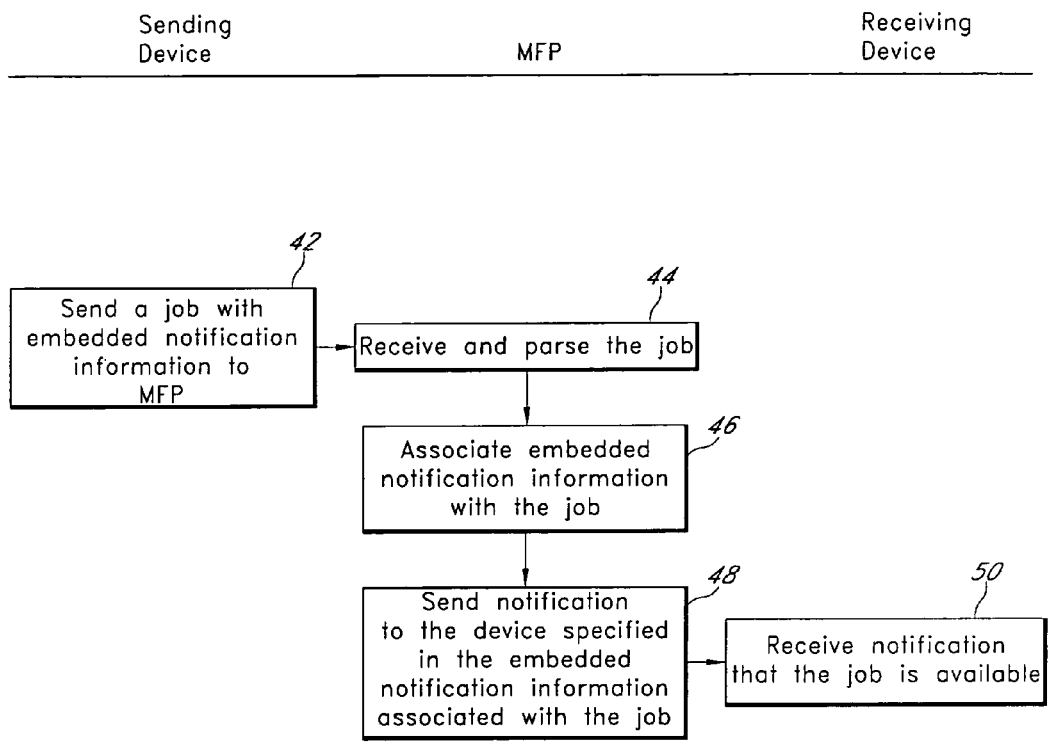
FIG. 2 is a flowchart of providing notification by embedding a notification message in an MFP job.

FIG. 2 illustrates a flowchart of a system and method for job-specific MFP notification. Prior to the events illustrated, a sending device embeds a notification message in the MFP job protocol. One possible job protocol is the Printer Job Language (PJL) protocol. An example embedded message in the PJL protocol is illustrated in FIG. 3.

In state 42, a sending device sends a MFP job with embedded notification information to the MFP. The sending device may be either one of the networked computing devices 32 or may be the MFP 30 itself. When the sending device is one of the networked computing devices 32, the user enters the notification information through a user interface that has been locally installed on one of the networked computing devices 32. The application software receives the notification message from the user and then embeds the message into the MFP job, which is then sent to the MFP 30. When the sending device is the MFP 30 itself, then the user enters the notification information through a user interface accessed from a web browser on one of the networked computing devices 32 or from the MFP 30 itself. In either case, the MFP 30 receives the notification message through the user interface and embeds the notification message into the MFP job. The MFP job is then sent to the portion of the MFP 30 that processes MFP jobs.

In state 44, the MFP 30 receives and parses the MFP job. Parsing the MFP job means extracting the embedded notification information from within the job. The methods for parsing jobs are well known in the art and will not be discussed further. In state 46, the MFP associates the embedded notification information with the MFP job. Associating information with a particular MFP job is well known in the art and will not be further discussed. In state 48, the MFP 30 sends notification to the device specified in the embedded notification information associated with the MFP job. In alternative embodiments (not shown), the notification message may be parsed prior to arriving at the MFP 30 and the notification information may be submitted separately to the MFP 30. In these embodiments, the MFP receives the MFP job and then separately receives the notification message. In state 48, the MFP associates the MFP job with the corresponding notification message.

As discussed above with reference to FIG. 1, the receiving device may be any remote communication device that is reachable by the MFP 30. For instance, the receiving device may be an email client, such as the email client 36. In this instance, the MFP sends an email message to an outgoing mail server. The outgoing mail server routes the message to a corresponding incoming mail server. The incoming mail server makes the email message available to the corresponding email client of the recipient who may download or otherwise access the mail message from the incoming mail server. Alternatively, the receiving device may be a telephone receiver. In this instance, the MFP 30 attempts to establish a connection with the telephone receiver. After establishing a connection, the MFP may send a notification message alerting the recipient that the MFP job is available. As discussed above with reference to FIG. 1, the notification message could be an identifying tone, or, alternatively, the notification message may be an automated voice recording. In yet another embodiment, the receiving device may be a text message client. In this instance, the MFP 30 sends a text message directed to the phone number accessible by the recipient's text message client. For instance, the text message client may be integrated with a cellular phone, and the text message may be routed to the recipient's cellular phone.

Although the illustrated embodiment only describes embedding a single notification in a MFP job, multiple notifications may be embedded in a job and sent. Accordingly, the MFP 30 may send notifications to multiple receiving devices. In yet other embodiments of the invention, the transmission of accompanying data with the job is optional. That is, only the required notification information is sent and additional message information is not provided. For instance, when an identifying tone indicates that a MFP job is available, no other message information is given. In state 50, the receiving device receives notification that the MFP job is available.

Although not illustrated here, any MFP job event may trigger the notification. For instance, if a job is terminated prematurely, a recipient of the notification message will be notified of that event. Alternatively, a recipient of a notification message may be advised that an MFP job has been initiated. Those skilled in the art will recognize many relevant events of which the users would want to apprise others, including themselves.

Additionally, although not illustrated in this embodiment, the MFP 30 may send notification messages to multiple receiving devices, if multiple devices are specified in the embedded message. The messages may be the same message or each a different message.

FIG. 3 illustrates an example embedded notification message for fax job. In the embodiment illustrated, the fax job is submitted in the Printer Job Language (PJL) protocol. The job begins with a new job command 52. Then the remote communication identifier 54 is specified. In this case, the remote communication identifier is the email address "joeuser@domain.com." As illustrated, specifying the address is included as a separate command in the protocol. The message 56 is also included in the job protocol. In this instance, the message reads "Joe, please read this report ASAP!" Finally, the end of job command 60 is given. The notification message may also be embedded in other job protocols (not shown).

Once the MFP job is finished, the specified notification message is delivered to the appropriate remote communication device. FIG. 4 illustrates an example delivered notification message for a fax job. This text could appear in the body of an email, or it could appear in the body of a text message, for example. A message may be composed of many elements. For instance, including a device message 70 may apprise the recipient that the MFP job is completed and available. Including a sender communication identifier 72 may inform the recipient of how to return contact to the sender. The name of the sending machine 74 may also be specified. In addition, a personal message 76 from the sender may be included. A time field 78 and a date field 80 may also be included. Additionally, information for retrieving the MFP job may be included, including the MFP name 82 and the MFP location 84. Finally, a page count 86 may also accompany a notification message. Additional information may also be included.

FIG. 5 illustrates a flowchart of an embodiment implementing a system and a method for user-stored MFP notification. In this embodiment, prior to receiving a MFP job, a user selects certain notification preferences. When a job is received from a particular MFP user, the corresponding notification preferences for that user will be accessed by the MFP 30. The user profile may include different notification preferences corresponding to different job types. For instance, a user may have different notification preferences for print jobs, fax jobs, scan jobs, or copy jobs. Although not illustrated, a user might have notification preferences for different subcategories of these types. For example, a fax job received from a United States area code could have a different notification configuration from that associated with an international fax job. An example of how print jobs could be associated with a different form of notification would be to have a notification for a particular group on the internal network or even a particular user.

FIG. 5 illustrates a flowchart for setup 88 and operation 90 of these systems and methods for storing notification preferences in user profiles and sending notification to recipients of MFP jobs according to the notification preferences of each user. The setup 88 is illustrated in the top half of FIG. 5. In step 92, a sending device sends notification preferences associated with the user to the MFP 30. As discussed above, with reference to FIG. 2, the sending device may be one of the network computing devices 32 or it may be a component of the MFP 30. Similar to the configuration for job-specific MFP notification (described with reference to FIG. 2), the sending device may communicate with the MFP via a MFP user interface. The user interface may request notification preferences for particular job types, such as print jobs, fax jobs, scan jobs, or copy jobs. Users of the MFP 30 may specify through the user interface their notification preferences for particular types of jobs that they anticipate submitting to the MFP. For instance, a user may choose to have a notification message sent to the user's own email client after every print job is completed. Alternatively, the user may specify sending a text message to a coworker's cell-phone for every fax job completed. In another embodiment (not illustrated), users may specify notification preferences for subcategories of job types. For example, users may specify a different notification preference for domestic fax jobs than for international fax jobs. Users may specify through the user interface all of the information appearing in the notification message, as for example illustrated in FIG. 4, as well as any additional information.

In step 94, the MFP receives and stores the notification preferences in the corresponding user's profile. Thus, each user profile may contain all of the information of the notification message as depicted in FIG. 4, as well as other related information. The MFP will receive the notification preferences via the user interface and store them in local memory. This memory may be volatile memory, such as RAM, available only for the duration of the active operation of the MFP 30, or restorable memory, such as a hard disk. Methods and systems for storing profiles of user data are well-known, and will not discussed further.

FIG. 5 also illustrates the operation 90 of systems and methods for user-stored MFP notification. In step 96, the sending device sends the MFP job to the MFP 30. In step 98, the MFP 30 receives and processes the MFP job. In addition, the MFP 30 makes the completed job available for the recipient. Although not illustrated here, any MFP job event may trigger the notification. For instance, if a job is terminated prematurely, a recipient of the notification message will be notified of that event. Alternatively, a recipient of a notification message may be advised that an MFP job has been initiated. Those skilled in the art will recognize many relevant events of which the users would want to apprise others, including themselves.

In step 100, the MFP 30 sends notification to the receiving device specified by the corresponding notification preference in the user's profile. The MFP accesses the stored user profile and identifies the specified device according to the MFP job type. For instance, if the job type is a fax job, the MFP locates the specified notification preference for fax jobs, as indicated in the user's profile. Once the MFP has identified the specified device, the MFP sends the notification message to the receiving device. The contents of the notification message may be determined from the information in the user's profile or may be determined according to the configuration of the MFP 30. Although not illustrated in this embodiment, the MFP 30 may send notification messages to multiple receiving devices, if multiple devices are specified in the user's profile. The messages may be the same message or each a different message. In step 102, the receiving device receives notification that the job is available, for example, for pick up.

Although not illustrated, in some embodiments, the stored user profiles may be overridden by embedded notification message. For instance, even if a user has previously entered job notification preferences, as contemplated in the embodiment illustrated in FIG. 5, the user may override such preferences by submitting an embedded notification message. It will be appreciated by one skilled in the art that there are many ways for implementing such override. For instance, the system may be configured to detect the presence of an embedded message, and then to search for the appropriate user profile if there is no embedded message for a particular job.

FIG. 6 illustrates an exemplary user interface for an MFP configured to notify recipients of MFP jobs. The user interface 104 may be installed directly on the MFP 30. Users may access the interface either from the console of the MFP or from a web browser of a connected machine, such as one of the networked computing devices 32. Alternatively, the user interface 104 may be installed on one of the network computing devices 32. In this embodiment, each MFP job type 106 is represented by a folder tab in the user interface 104. Thus, a separate folder exists for print jobs, fax jobs, scanned jobs, and copy jobs. For each separate folder, the user may specify notification preferences for the job types operable on the MFP 30. For instance, in the illustrated user interface, the user has selected to send notification messages for print jobs by way of email. The mark in the check box 108 indicates that the user has selected to send notification messages by way of email. The text box 110 corresponding to the email icon provides space for the user to enter an email address to which a notification message should be sent. Because the user has not selected the check boxes 108 corresponding to the telephone icon 114 or the cell phone text message icon 116, the user is currently prohibited from entering phone numbers for either of those devices. Although not illustrated, the user interface may include additional and/or different fields, including, for example, all of the message fields illustrated in FIG. 4. Additionally, other related information may be entered through the user interface. Moreover, multiple remote communication identifiers may be specified for a particular job type. That is, multiple recipients for notification may be specified.

Although this invention has been described in terms of certain embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. A method of operation of multi-function peripheral (MFP) job notification system, the method comprising:
   receiving a MFP job with a notification message having a security information;
   verifying the security information for opening the MFP job;
   categorizing the notification message based on the MFP job;
   associating the MFP job with the notification message, the MFP job opened with the security information; and
   sending, in response to a completion of the MFP job, the notification message to at least one remote communication device.

2. The method of claim 1, wherein the notification message is comprised of at least one of the following communication types: text, image, and sound.

3. The method of claim 2, wherein the notification message is comprised of at least one of the following message types: email, phone voice, identifying tone, and cell phone text.

4. The method of claim 1, wherein, the notification message comprises at least one of the following information elements: device messages, user specific messages, MFP name and location, job name, date, time, submission user name, and fax telephone number.

5. The method of claim 1, wherein the at least one remote communication device is one of the following: email client, telephone, text message client, walkie-talkie radio, Bluetooth device, wireless protocol device, and paging device.

6. The method of claim 1, further comprising sending the MFP job to the at least one remote communication device.

7. The method of claim 6, wherein the remote communication device comprises at least one of the following: another MFP and a central repository.

8. The method of claim 1, wherein sending the notification message to the at least one remote communication device comprises sending the notification message to multiple remote communication devices.

9. The method of claim 1 further comprising receiving the notification message from a stored user profile.

10. The method of claim 1, wherein the MFP job includes the notification message embedded in job protocol commands.

11. The method of claim 10, wherein the job protocol commands are in the Printer Job Language (PJL).

12. A method of operation of multi-function peripheral (MFP) job notification system, the method comprising:

receiving a MFP job with a notification message having a security information;

verifying the security information for opening the MFP job;

categorizing the notification message based on the MFP job;

receiving at least one remote communication identifier;

associating the MFP job with the at least one remote communication identifier, the MFP job opened with the security information; and directing the notification message, in response to a completion of the MFP job, to the at least one remote communication identifier.

13. The method of claim 12, wherein the at least one remote communication identifier is an email address.

14. The method of claim 12, wherein the at least one remote communication identifier is a telephone number.

15. The method of claim 12, wherein receiving at least one remote communication identifier comprises parsing the MFP job to determine the at least one remote communication identifier.

16. The method of claim 15, wherein the MFP job comprises at least one job protocol command.

17. The method of claim 16, wherein the at least one job protocol command is a Printer Job Language (PJL) command.

18. The method of claim 12, wherein receiving at least one remote communication identifier comprises accessing a stored user profile comprising the at least one remote communication identifier.

19. A system for multi-function peripheral (MFP) job notification, the system comprising:

a MFP, the MFP being configured to receive a MFP job with a notification message having a security information, being further configured to verify the security information for opening the MFP job, being further configured to store at least one remote communication identifier associated with a remote communication device, being further configured to process the MFP job associated with the at least one remote communication identifier and the MFP job opened with the security information, being further configured to categorize the notification message based on the MFP job, and being further configured to transmit, in response to a completion of the MFP job, the notification message directed to the device associated with the remote communication identifier.

20. The system of claim 19, wherein the MFP is further configured to transmit notification via at least one of the following: digital packets, digital and analog telephone signals, wireless phone signal, short range frequency, and radio frequency.

21. The system of claim 19, wherein the MFP is further configured to transmit the notification message over at least one of the following networks: Internet, telephone, wireless telephone.

22. The system of claim 19, wherein the at least one remote communication identifier is an email address.

23. The system of claim 19, wherein the at least one remote communication identifier is a telephone number.

24. The system of claim 19, wherein the MFP is further configured to deliver processed jobs to a mailbox.

25. A non-transitory computer readable medium having machine loadable software for multi-function peripheral (MFP) job notification, wherein the software is configured to perform a method comprising:

verifying a security information for opening a MFP job received, the MFP job with a notification message having the security information;

providing a user interface, wherein the user interface is configured to receive at least one remote communication identifier for at least one MFP job type to allow the notification message to be sent to the remote communication identifier in response to a completion of the MFP job;

creating, for at least one user, a user profile having at least one remote communication identifier and the security information for the at least one MFP job type; and storing the at least one user profile.

26. The method of claim 25, wherein the user interface is further configured to implement a mailbox feature.

27. A non-transitory computer readable medium having machine loadable software for multi-function peripheral (MFP) job notification, wherein the software is configured to perform a method comprising:

verifying a security information for opening a MFP job received, the MFP job with a notification message having the security information;

providing a user interface for receiving at least one remote communication identifier associated with a remote communication device; and embedding the at least one remote communication identifier in the MFP job, the MFP job opened with the security information, to allow the notification message to be sent to the remote communication device in response to a completion of the MFP job.

28. The method of claim 27, wherein the MFP job comprises job protocol commands.

29. The method of claim 28, wherein the job protocol commands are JPL commands.

30. The method of claim 29, wherein the user interface comprises a mailbox feature.

31. A system for multi-function peripheral (MFP) job notification, the system comprising:

a processor; and software executed by the processor, configured to perform the following: setting notification preferences in the MFP;

verifying a security information for opening a MFP job with a notification message having the security information;

categorizing the notification message based on the MFP job;

sending the notification message, in response to a completion of the MFP job, the MFP job opened with the security information, to a remote communication destination in a format specified by the notification preferences.

* * * * *